(12) United States Patent
Pan et al.

(10) Patent No.: US 11,297,231 B1
(45) Date of Patent: Apr. 5, 2022

(54) UNINTERRUPTIBLE POWER SYSTEM POWERED BY POWER OVER ETHERNET AND METHOD THEREOF

(71) Applicant: ANTAIRA TECHNOLOGIES, LLC, Brea, CA (US)

(72) Inventors: Woody Pan, New Taipei (TW); Jeff Yang, New Taipei (TW)

(73) Assignee: Antaira Technologies, LLC, Brea, CA (US)

( * ) Notice: Subject to any disclaimer, the term of this patent is extended or adjusted under 35 U.S.C. 154(b) by 0 days.

(21) Appl. No.: 17/228,851

(22) Filed: Apr. 13, 2021

(51) Int. Cl.
| | |
|---|---|
| H04N 7/18 | (2006.01) |
| H04N 5/232 | (2006.01) |
| H02J 9/06 | (2006.01) |
| H04L 12/10 | (2006.01) |
| H04N 5/76 | (2006.01) |
| G10L 25/57 | (2013.01) |

(52) U.S. Cl.
CPC ......... *H04N 5/23241* (2013.01); *G10L 25/57* (2013.01); *H02J 9/061* (2013.01); *H04L 12/10* (2013.01); *H04N 5/76* (2013.01); *H04N 7/18* (2013.01)

(58) Field of Classification Search
CPC .......... H04L 12/10; H04B 1/38; H02H 9/008; G06F 1/263

USPC ....... 348/143, 135, 137, 139, 140, 142, 151; 386/210, 226
See application file for complete search history.

(56) References Cited

U.S. PATENT DOCUMENTS

| | | | | |
|---|---|---|---|---|
| 10,666,447 | B2 * | 5/2020 | He | H04L 12/10 |
| 2014/0115354 | A1 * | 4/2014 | Jabbaz | H04L 12/10 |
| | | | | 713/310 |

FOREIGN PATENT DOCUMENTS

TW        201416978 A  *  5/2014

* cited by examiner

*Primary Examiner* — Robert Chevalier
(74) *Attorney, Agent, or Firm* — Rosenberg, Klein & Lee

(57) ABSTRACT

An Uninterruptible Power System (UPS) powered by Power over Ethernet (PoE) is equipped with a power sourcing equipment (PSE) supplying a direct current (DC) voltage to a powered device (PD) through Ethernet cables, and an Ethernet switch which includes a packet switching controller including a central processing unit (CPU) controlling the ON/OFF states of at least one pair of DC voltage output and the onset of an initialization process of the PSE; the Ethernet switch further includes a non-volatile memory storing a firmware which provides a reboot process of the CPU such that when the UPS powered by PoE is undergoing the reboot process, the PSE can continue to supply the DC voltage. A first parameter PersistentPoE and a second parameter PPoE_flag are used for setting the ON/OFF states of DC voltage output of PoE.

7 Claims, 3 Drawing Sheets

UNINTERRUPTIBLE POWER SYSTEM POWERED BY POWER OVER ETHERNET AND METHOD THEREOF

BACKGROUND OF THE INVENTION

1. Field of the Invention

The present invention relates to an uninterruptible power system, particularly to an uninterruptible power system powered by Power over Ethernet and a method thereof.

2. Description of the Related Art

Nowadays, Ethernet switches equipped with Power over Ethernet (PoE) functions are very popular. PoE is a very important method to supply power. PoE technology is mainly used in places where there is presence of Ethernet and especially, at the same time, without any available power source. PoE has a plug-and-play function. By using PoE functions, users need not look for other power sources, thus convenience and cost-saving can be achieved. The main functions of PoE are as follows. A power sourcing equipment (PSE) provides DC power to a powered device (PD) through Ethernet cables with mutual communications between the PoE and the PD to ensure safe operations. A PSE is usually integrated with an Ethernet switch either as an internal circuit module or as an external device. And a PD is usually a security IP camera, a femtocell, a VoIP phone, a signage/display, a lighting, a medical equipment, a vehicle infotainment equipment, a point of sales equipment, or a Radio Frequency Identification (RFID), etc.

As the PoE technology becomes ever more popular, more security IP cameras powered by PoE appear in many areas not monitored by personnel. These security IP cameras play key roles in monitoring these areas by continuously monitoring the areas and transmitting video images and sound track information without any interruptions. However, a network equipment which connects to, provides power through PoE technology to, and transmits data packets for the security IP cameras, for example an Ethernet switch, may be down and fail to transmit data packets at times, and on such occasions, the network equipment will usually get rebooted; consequently, the network equipment with PoE technology will no longer supply power to the security IP cameras, and that will cause missing periods for the monitoring video images and sound track information.

According to the afore-mentioned, the conventional PoE technology must be further improved.

SUMMARY OF THE INVENTION

There are two types of reboot for ordinary network equipment, namely, hot reboot and cold reboot. Hot reboot means to reboot the equipment without shutting down the power, whereas, cold reboot means to reboot the equipment by shutting down the power.

In view of the above-mentioned problems in the conventional PoE technology, the present invention discloses an uninterruptible power system (UPS) powered by PoE and a method thereof so that a network equipment using PoE technology undergoing a reboot process may still provide electric power to security IP cameras regardless of the reboot process, and the security IP cameras may continue to monitor and temporarily store the monitoring video image data and sound track information by themselves, until the network equipment finishes the reboot process; then, the said stored video image data and sound track information will be transmitted to the network equipment. In this way, there will be no missing periods for the monitoring video images and sound track information. To be more specific, the present invention of the uninterruptible power system powered by PoE includes the following features:

An uninterruptible power system (UPS) powered by Power over Ethernet (PoE), including: a power sourcing equipment (PSE) providing at least one set of direct current (DC) voltage output to at least one powered device (PD) through at least one Ethernet cable, and the PSE including a reset input terminal;

an Ethernet switch, including: a packet switch controller, including: a central processing unit (CPU), electrically connected to the PSE, to control the at least one set of DC voltage output, wherein the CPU enables the PSE through the reset input terminal of the PSE to stop the PSE from supplying DC voltage and to start an initialization process for the PSE;

a memory, containing a firmware, wherein the firmware provides a reboot process to be executed by the CPU so that the PSE continues to supply the at least one set of DC voltage output when the UPS powered by PoE is undergoing the reboot process.

Preferably, the packet switch controller further includes a physical layer having multiple differential signal output terminals and multiple differential signal input terminals.

Preferably, the UPS powered by PoE further includes: multiple isolation coil sets, wherein each of the multiple isolation coil sets has a first side and a second side, and at the first side, each of the multiple isolation coil sets is electrically connected to a respective one of the multiple differential signal output terminals and a respective one of the multiple differential signal input terminals.

Preferably, the PSE further includes: a digital power controller, electrically connected to the CPU, to receive a signal from the CPU and thereby output a control signal; an analog power controller, having multiple voltage output terminals, wherein each of the multiple voltage output terminals is electrically connected to the second side of a corresponding one of the multiple isolation coil sets, and at the same time, the analog power controller is electrically connected to the digital power controller to receive the control signal from the digital power controller, thereby to control output states of the multiple voltage output terminals, and the output states include an ON output state and an OFF output state.

Preferably, the UPS powered by PoE further includes at least one connector, wherein each of the at least one connector is connected to corresponding ones of the multiple voltage output terminals to receive one of the at least one set of DC voltage output; and each of the at least one PD is electrically connected to a corresponding one of the at least one connector to receive a set of DC voltage as the electric power.

The present invention further discloses a method of UPS powered by PoE, which utilizes an UPS powered by PoE to provide DC power, and the UPS powered by PoE includes an Ethernet switch and a PSE, when a first parameter PersistentPoE is enabled, the UPS powered by PoE supplies at least one DC voltage to at least one PD connected to the UPS powered by PoE, and when the first parameter PersistentPoE is disabled, the UPS powered by PoE stops supplying DC voltage, and when a second parameter PPoE_flag is set to be TRUE and the UPS powered by PoE is undergoing a reboot process, the UPS powered by PoE will continuously supply the at least one DC voltage to the at least one PD connected to the UPS powered by PoE, and when the second parameter PPoE_flag is set to be FALSE and the UPS powered by PoE is undergoing a reboot process, the UPS powered by PoE will stop supplying DC voltage, and the method of UPS powered by PoE further includes the following steps:

S0: the UPS powered by PoE receiving a system reboot signal;

S1: when the system reboot signal is a firmware initialization signal or a software reset signal, skipping to S8; and when the system reboot signal is a hardware reset signal, proceeding to the next step;

S2: executing a system initialization process to reboot the Ethernet switch;

S3: when the first parameter PersistentPoE is not enabled, skipping to S6 and when the first parameter PersistentPoE is enabled, proceeding to the next step;

S4: when the second parameter PPoE_flag is FALSE, skipping to S6, and when the second parameter PPoE_flag is TRUE, proceeding to the next step;

S5: setting the second parameter PPoE_flag to be FALSE, and storing the value of the second parameter PPoE_flag to a firmware; end of flow;

S6: enabling a reset input terminal of a digital power controller, to start a PSE initialization process, and to stop supplying DC power to the connected PDs;

S7: the PSE executing the PSE initialization process; end of flow;

S8: when the first parameter PersistentPoE is not enabled, skipping to S10, and when the first parameter PersistentPoE is enabled, proceeding to the next step;

S9: setting the second parameter PPoE_flag to be TRUE and storing the value of the second parameter PPoE_flag to the firmware, then skipping to S2;

S10: setting the second parameter PPoE_flag to be FALSE and storing the value of the second parameter PPoE_flag to the firmware, then skipping to S2.

The present invention further discloses a security IP camera utilizing an UPS powered by PoE which includes the following features:

when the UPS powered by PoE is rebooting, the UPS powered by PoE continuously supplies electric power to the security IP camera, and accordingly, the security IP camera continues to monitor and record video images and sound track information, and the video images and sound track information recorded during the rebooting are stored in the security IP camera temporarily until the UPS powered by PoE finishes the rebooting, then, the security IP camera starts to transmit the video images and sound track information recorded during the rebooting to the UPS powered by PoE.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of the embodiments of the present invention, but not all the embodiments. Based on the embodiments of the present invention, all other embodiments obtained by a person of ordinary skill in the art without creative efforts shall fall within the protection scope of the present invention.

Figure 1:
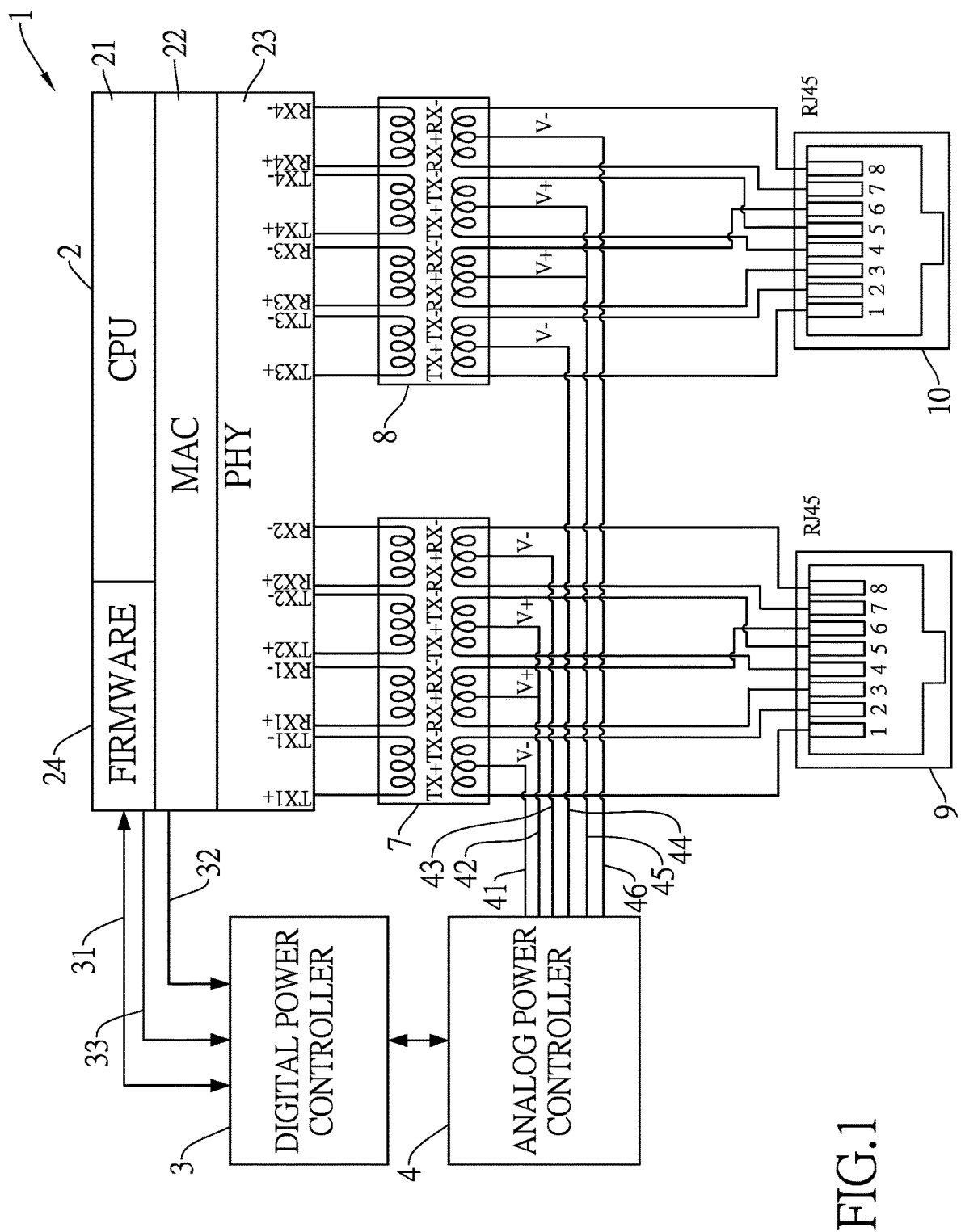
FIG. 1 is the main circuit diagram for the UPS powered by PoE of the present invention.

With reference to FIG. 1, in this embodiment, the UPS powered by PoE 1 is essentially an Ethernet switch with PoE functions, and the UPS powered by PoE 1 is capable of providing DC power to multiple connected PDs. When the UPS powered by PoE 1 is rebooting, the UPS powered by PoE 1 is still capable of providing DC power to the multiple connected PDs.

The UPS powered by PoE 1 has a packet switch controller 2, a digital power controller 3, an analog power controller 4, a first isolation coil set 7, a second isolation coil set 8, a first connector 9 and a second connector 10. The first connector 9 and the second connector 10 each have 8 external connection terminals for connecting to 4 pairs of transmission lines.

The packet switch controller 2 has a CPU 21, a media access control (MAC) 22, a physical layer (PHY) 23, and a non-volatile memory which stores a firmware 24, wherein the physical layer 23 has the first to the fourth differential signal output terminal pairs (TX1+, TX1−), (TX2+, TX2−), (TX3+, TX3−), (TX4+, TX4−) and the first to the fourth differential signal input terminal pairs (RX1+, RX1−), (RX2+, RX2−), (RX3+, RX3−), (RX4+, RX4−), wherein, the first to the second differential signal output terminal pairs and the first to the second differential signal input terminal pairs are configured to interleave and to couple to the first connector 9 through a first isolation coil set 7, such that the 8 external connection terminals of the first connector 9 are corresponding to the differential signal terminals TX1+, TX1−, RX1+, TX2+, TX2−, RX1−, RX2+, RX2− from left to right. And the third to the fourth differential signal output terminal pairs and the third to the fourth differential signal input terminal pairs are configured to interleave and to couple to the second connector 10 through a second isolation coil set 8, such that the 8 external connection terminals of the first connector 10 are corresponding to the differential signal terminals TX3+, TX3−, R3X+, TX4+, TX4−, RX3−, RX4+, RX4− from left to right. Wherein, the first connector 9 and the second connector 10 are commonly used Ethernet RJ45 connectors. The first connector 9 and the second connector 10 may each connect to a network device via an Ethernet cable, for example, a CAT5 type Ethernet cable. The first isolation coil set 7 and the second isolation coil set 8 each have 4 identical and independent coupling coil pairs, wherein, each coupling coil pair has two separated inductive coils, namely, the first side inductive coil and the second side inductive coil which are inductively coupled with each other. Each coupling coil pair is capable of bi-directionally coupling a pair of alternating (AC) signals on the first or the second side inductive coil to a pair of alternating (AC) signals on the second or the first side inductive coil respectively. At the same time, each first side inductive coil and each second side inductive coil are capable of conducting a direct current without shorting to other inductive coils.

The digital power controller 3 further has an $I^2C$ interface 31 and an interrupting terminal 32. Through $I^2C$ interface 31 and the interrupting terminal 32, the digital power controller 3 is electrically connected to the packet switch controller 2. The digital power controller 3 and the analog power controller 4 are electrically connected. The digital power controller 3 can control the DC power outputs of the analog power controller 4. The analog power controller 4 can provide DC voltage to the 8 connection terminals of the first connector 9 and the 8 connection terminals of the second connector 10. Wherein, the digital power controller 3 is a mixed mode circuit for communicating between the analog power controller 4 and the packet switch controller 2. At the same time, the digital power controller 3 can shield the high voltage in the analog power controller 4 completely to protect other low voltage circuits in the UPS powered by PoE 1, for example, the packet switch controller 2 and so on. The analog power controller 4 has first to sixth voltage output terminals 41-46, wherein the first and the third voltage output terminals 41, 43 each respectively electrically connect and output a DC low voltage V− to an inductive coil of the coupling coil pairs of the first isolation coil set 7 corresponding to (TX1+, TX1−), (RX2+, RX2−), and the fourth and the sixth voltage output terminals 44, 46 each respectively electrically connect and output a DC low voltage V− to an inductive coil of the coupling coil pairs of the second isolation coil set 8 corresponding to (TX3+, TX3−), (RX4+, RX4−), and the second voltage output terminal 42 electrically connect and output a DC high voltage V+ to both an inductive coil of the coupling coil pair of the first isolation coil set 7 corresponding to (RX1+,RX1−) and an inductive coil of the coupling coil pair of the first isolation coil set 7 corresponding to (TX2+,TX2−), and the fifth voltage output terminal 45 electrically connect and output a DC high voltage V+ to both an inductive coil of the coupling coil pair of the second isolation coil set 8 corresponding to (RX3+, RX3−) and an inductive coil of the coupling coil pair of the second isolation coil set 8 corresponding to (TX4+,TX4−).

Figure 2:
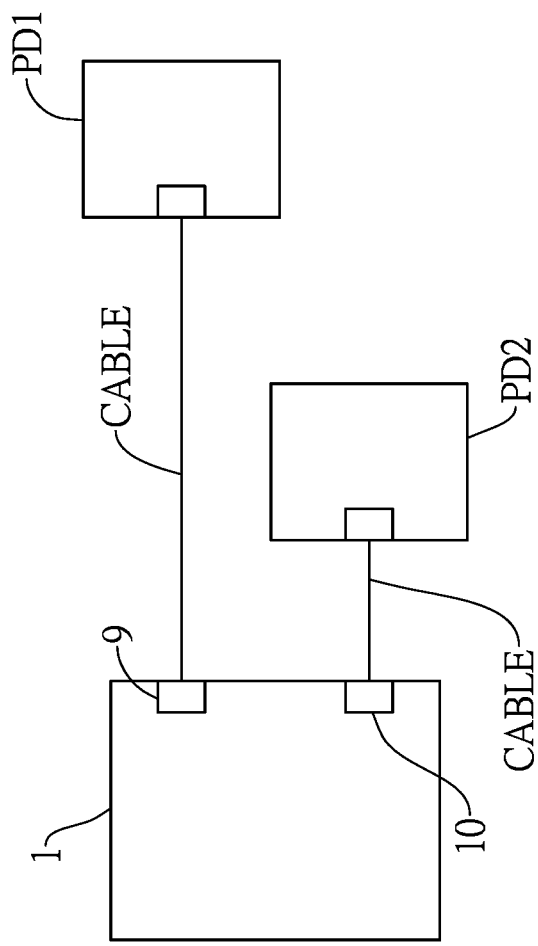
FIG. 2 is a schematic view for security IP cameras connected with the UPS powered by PoE of the present invention.

With reference to FIG. 1 and FIG. 2, the first voltage output terminal 41 outputs the DC low voltage V− to a pair of transmission lines corresponding to the first differential signal output terminal pair (TX1+, TX1−), thereby providing the DC low voltage V− to the first security IP camera (PD1) connected through the first connector 9. Similarly, the second to the third voltage output terminals 42-43 each output a respective DC voltage to a respective pair of transmission lines corresponding to a respective differential signal output terminal pair to provide the respective DC voltage to the first security IP camera (PD1) connected through the first connector 9. Likewise, the fourth to the sixth voltage output terminals 44-46 each output a respective DC voltage to a respective pair of transmission lines corresponding to a respective differential signal output terminal pair to provide the respective DC voltage to the second security IP camera (PD2) connected through the first connector 10. As can be known from the above-mentioned, the combination of the digital power controller 3 and the analog power controller 4 is exactly the PSE, and the first and the second security IP cameras (PD1, PD2) respectively connected via the first and the second connectors 9, 10 are the PDs.

The reboot process of general network equipment can be divided into "warm boot" and "cold boot", "warm boot" is a reboot process without turning off the power of the network equipment, and "cold boot" is a reboot process that involves turning off the power of the network equipment.

The present invention of the method of UPS powered by PoE provides a first parameter PersistentPoE and a second parameter PPoE_flag to set the states of the UPS powered by PoE 1. The value of the first parameter PersistentPoE is respectively set to be 0/1 when the first parameter PersistentPoE is enabled/disabled. The value of the second parameter PPoE_flag is respectively set to be I/O when the second parameter PPoE_flag is TRUE/FALSE. The second parameter PPoE_flag is stored in the firmware 24 which can be a FLASH Memory. When the first parameter PersistentPoE is enabled, the PSE can provide DC current to PDs connected to the UPS powered by PoE 1 (i.e. ON state), and when the first parameter PersistentPoE is disabled, the PSE stops providing DC current. When the second parameter PPoE_flag is TRUE, the UPS powered by PoE 1 may continuously provide DC current to the connected PDs when the UPS powered by PoE 1 is undergoing a reboot process (i.e. ON state). When the second parameter PPoE_flag is FALSE, the UPS powered by PoE 1 stops providing DC current to the connected PDs when the UPS powered by PoE 1 is undergoing a reboot process (i.e. OFF state). In addition, the digital power controller 3 of the PSE has a reset input terminal 33. When the reset input terminal 33 is enabled, the digital power controller 3 will turn off all the power outputs of the analog power controller 4, such that the UPS powered by PoE 1 stops supplying power to the connected PDs (i.e. OFF state). The reboot process of the UPS powered by PoE 1 includes two parts, namely, the reboot of the Ethernet switch (i.e. the UPS powered by PoE 1 excluding the PSE) and the reboot of the PSE. In the present invention of the method of the UPS powered by PoE, there is a system initialization process 81 and a PSE initialization process 82 respectively corresponding to the reboot of the Ethernet switch and the reboot of the PSE.

When the UPS powered by PoE 1 receives a system reboot signal 61, the UPS powered by PoE 1 will first determine whether the system reboot signal is a hardware reset signal 62, a firmware initialization signal 63, or a software reset signal 64. When the UPS powered by PoE 1 determines that the system reboot signal 61 is the hardware reset signal 62, the UPS powered by PoE 1 will first execute the system initialization process 81 to reboot the Ethernet switch, and concurrently, the UPS powered by PoE 1 will determine whether the first parameter PersistentPoE is enabled. When the first parameter PersistentPoE is enabled and the second parameter PPoE_flag is TRUE, then set the second parameter PPoE_flag to be FALSE (i.e. PPoE_flag=0) and store the value of the second parameter PPoE_flag to the firmware 24.

When the first parameter PersistentPoE is not enabled or when the first parameter PersistentPoE is enabled but the second parameter PPoE_flag is FALSE, the UPS powered by PoE 1 will enable the reset input terminal 33 of the digital power controller 3, and then the UPS powered by PoE 1 will stop the PoE power supplying to the connected PDs. At the same time, the PSE initialization process 82 will be activated to initialize the digital power controller 3 and the analog power controller 4 (i.e. the PSE).

In addition, when the system reboot signal 61 is the firmware initialization signal 63 or the software reset signal 64, the UPS powered by PoE 1 will first determine whether the first parameter PersistentPoE is enabled. When the first parameter PersistentPoE is enabled, then the second parameter PPoE_flag is set to be TRUE (i.e. PPoE_flag=1), otherwise the second parameter PPoE_flag is set to be FALSE (i.e. PPoE_flag=0), and then the system initialization process 81 and subsequent actions are executed.

Figure 3:
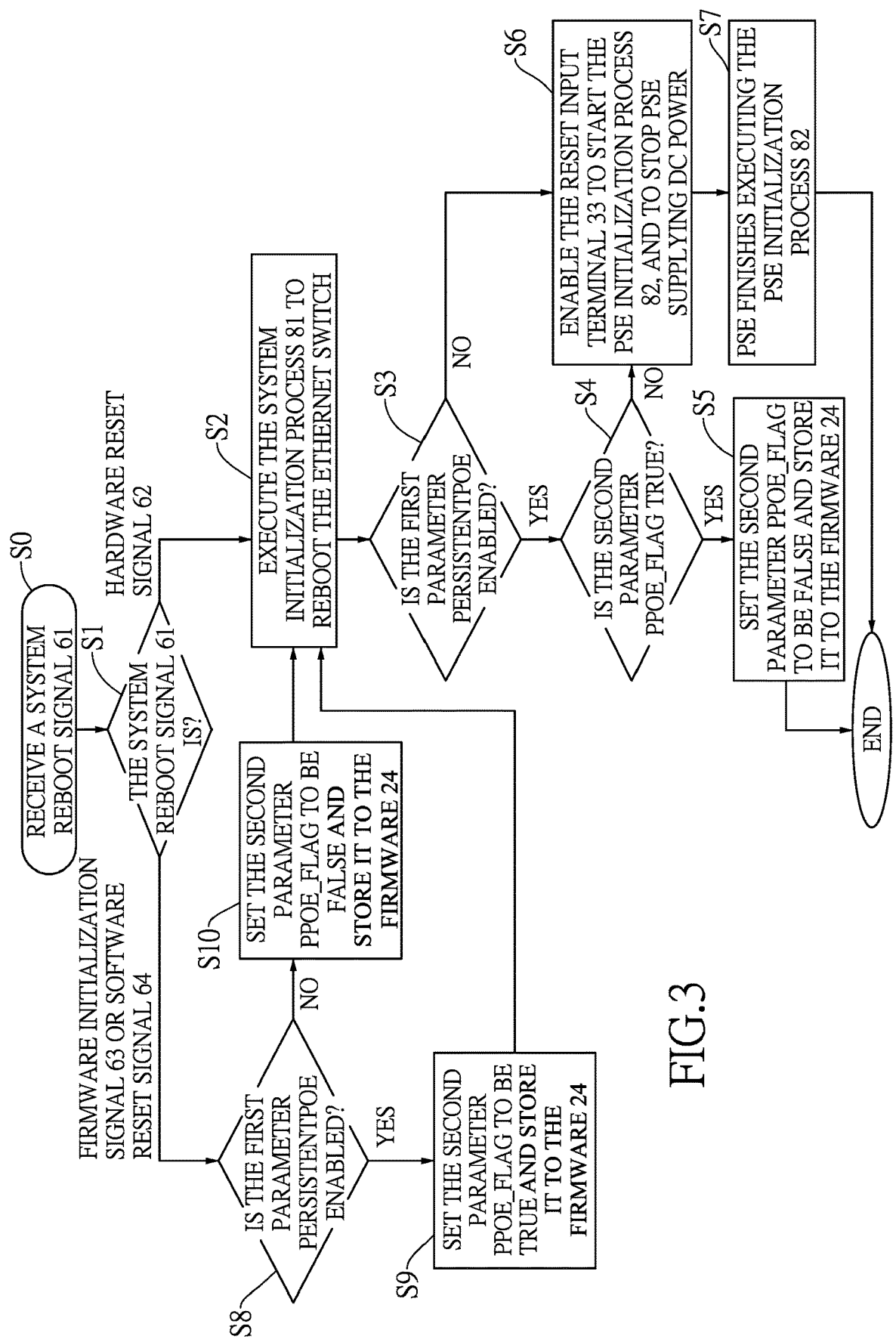
FIG. 3 is a flowchart for an embodiment of the UPS powered by PoE of the present invention.

With reference to FIG. 3, the above-mentioned methods are summarized as the method of the UPS powered by PoE of the present invention, which includes the following steps.

Step 0(S0): The UPS powered by PoE 1 receives a system reboot signal 61.

Step 1(S1): When the system reboot signal 61 is the firmware initialization signal 63 or the software reset signal 64, skip to Step 8(S8), and when the system reboot signal 61 is the hardware reset signal 62, proceed to the next step.

Step 2(S2): Execute the system initialization process 81 to reboot the Ethernet switch.

Step 3(S3): When the first parameter PersistentPoE is not enabled, skip to Step 6 (S6) and when the first parameter PersistentPoE is enabled, proceed to the next step.

Step 4(S4): When the second parameter PPoE_flag is FALSE, skip to Step 6 (S6), and when the second parameter PPoE_flag is TRUE, proceed to the next step.

Step 5(S5): Set the second parameter PPoE_flag to be FALSE (i.e. PPoE_flag=0), and store the value of the second parameter PPoE_flag to the firmware 24; end of flow.

Step 6(S6): Enable the reset input terminal 33 of the digital power controller, to start the PSE initialization process 82, and stop supplying DC power to the connected PDs.

Step 7(S7): The PSE executes the PSE initialization process 82; end of flow.

Step 8(S8): When the first parameter PersistentPoE is not enabled, skip to Step 10(S10), and when the first parameter PersistentPoE is enabled, proceed to the next step.

Step 9(S9): Set the second parameter PPoE_flag to be TRUE (i.e. PPoE_flag=1) and store the value of the second parameter PPoE_flag to the firmware 24, then skip to Step 2(S2).

Step 10(S10): Set the second parameter PPoE_flag to be FALSE (i.e. PPoE_flag=0) and store the value of the second parameter PPoE_flag to the firmware 24, then skip to Step 2(S2).

In summary, the method of UPS powered by PoE of the present invention discloses when the UPS powered by PoE 1 is undergoing firmware update or warm software reboot, the UPS powered by PoE 1 can still continuously supply power to the connected PDs, thereby achieving the purposes of the present invention.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An uninterruptible power system (UPS) powered by Power over Ethernet (PoE), including:
   a power sourcing equipment (PSE) providing at least one set of direct current (DC) voltage output to at least one powered device (PD) through at least one Ethernet cable, and the PSE including a reset input terminal;
   an Ethernet switch including:
     a packet switch controller including:
       a central processing unit (CPU), electrically connected to the PSE, to control the at least one set of DC voltage output, wherein the CPU enables the PSE through the reset input terminal of the PSE to stop the PSE from supplying DC voltage and to start an initialization process for the PSE; and
     a memory, containing a firmware, wherein the firmware provides a reboot process to be executed by the CPU so that the PSE continues to supply the at least one set of DC voltage output when the UPS powered by PoE is undergoing the reboot process.

2. The UPS powered by PoE as claimed in claim 1, wherein the packet switch controller further includes a physical layer having multiple differential signal output terminals and multiple differential signal input terminals.

3. The UPS powered by PoE as claimed in claim 2, further including:
   multiple isolation coil sets, wherein each of the multiple isolation coil sets has a first side and a second side, and at the first side, each of the multiple isolation coil sets is electrically connected to a respective one of the multiple differential signal output terminals and a respective one of the multiple differential signal input terminals.

4. The UPS powered by PoE as claimed in claim 3, wherein the PSE further includes:
   a digital power controller, electrically connected to the CPU, to receive a signal from the CPU and thereby output a control signal; and
   an analog power controller, having multiple voltage output terminals, wherein each of the multiple voltage output terminals is electrically connected to the second side of a corresponding one of the multiple isolation coil sets, and at the same time, the analog power controller is electrically connected to the digital power controller to receive the control signal from the digital power controller, thereby to control output states of the multiple voltage output terminals, and the output states include an ON output state and an OFF output state.

5. The UPS powered by PoE as claimed in claim 3, further including at least one connector, wherein each of the at least one connector is connected to corresponding ones of the multiple voltage output terminals to receive one of the at least one set of DC voltage output; and each of the at least one PD is electrically connected to a corresponding one of the at least one connector to receive a set of DC voltage as the electric power.

6. A method of uninterruptible power system (UPS) powered by Power over Ethernet (PoE), utilizing a UPS powered by PoE to provide direct current (DC) power, and the UPS powered by PoE including an Ethernet switch and a power sourcing equipment (PSE), wherein when a first parameter PersistentPoE is enabled, the UPS powered by PoE supplies at least one DC voltage to at least one powered device (PD) connected to the UPS powered by PoE, and when the first parameter PersistentPoE is disabled, the UPS powered by PoE stops supplying DC voltage, and when a second parameter PPoE_flag is set to be TRUE and the UPS powered by PoE is undergoing a reboot process, the UPS powered by PoE will continuously supply the at least one DC voltage to the at least one PD connected to the UPS powered by PoE, and when the second parameter PPoE_flag is set to be FALSE and the UPS powered by PoE is undergoing the reboot process, the UPS powered by PoE will stop supplying DC voltage, and the method of UPS powered by PoE further include the following steps:
   S0: the UPS powered by PoE receiving a system reboot signal;
   S1: when the system reboot signal is a firmware initialization signal or a software reset signal, skipping to S8;

and when the system reboot signal is a hardware reset signal, proceeding to the next step;

S2: executing a system initialization process to reboot the Ethernet switch;

S3: when the first parameter PersistentPoE is not enabled, skipping to S6 and when the first parameter PersistentPoE is enabled, proceeding to the next step;

S4: when the second parameter PPoE_flag is FALSE, skipping to S6, and when the second parameter PPoE_flag is TRUE, proceeding to the next step;

S5: setting the second parameter PPoE_flag to be FALSE, and storing the value of the second parameter PPoE_flag to a firmware; end of flow;

S6: enabling a reset input terminal of a digital power controller, to start a PSE initialization process, and to stop supplying DC power to the connected PDs;

S7: the PSE executing the PSE initialization process; end of flow;

S8: when the first parameter PersistentPoE is not enabled, skipping to S10, and when the first parameter PersistentPoE is enabled, proceeding to the next step;

S9: setting the second parameter PPoE_flag to be TRUE and storing the value of the second parameter PPoE_flag to the firmware, then skipping to S2; and S10: setting the second parameter PPoE_flag to be FALSE and storing the value of the second parameter PPoE_flag to the firmware, then skipping to S2.

7. A security IP camera utilizing a UPS powered by PoE as claimed in claim 1, wherein when the UPS powered by PoE is rebooting, the UPS powered by PoE continuously supplies electric power to the security IP camera, and accordingly, the security IP camera continues to monitor and record video images and sound track information, and the video images and sound track information recorded during the rebooting are stored in the security IP camera temporarily until the UPS powered by PoE finishes the rebooting, and the security IP camera starts to transmit the video images and sound track information recorded during the rebooting to the UPS powered by PoE.

* * * * *